April 16, 1968 A. W. BARBER 3,378,788

VOLTAGE RESPONSIVE LIGHT SOURCE FOR CONTROLLING
VARIABLE FREQUENCY R-C OSCILLATORS

Filed June 30, 1966 2 Sheets-Sheet 1

INVENTOR.
Alfred W. Barber

April 16, 1968 A. W. BARBER 3,378,788

VOLTAGE RESPONSIVE LIGHT SOURCE FOR CONTROLLING VARIABLE FREQUENCY R-C OSCILLATORS

Filed June 30, 1966 2 Sheets-Sheet 2

INVENTOR.

Alfred W. Barber

United States Patent Office 3,378,788
Patented Apr. 16, 1968

3,378,788

VOLTAGE RESPONSIVE LIGHT SOURCE FOR CONTROLLING VARIABLE FREQUENCY R-C OSCILLATORS

Alfred W. Barber, Bayside, N.Y.
(32—44 Francis Lewis Blvd., Flushing, N.Y. 11358)

Filed June 30, 1966, Ser. No. 561,805
9 Claims. (Cl. 331—66)

ABSTRACT OF THE DISCLOSURE

An operational amplifier, a lamp and two or more photoconductive cells are used to control the frequency of an oscillator in accordance with an input voltage. The input voltage is applied to the operational amplifier which is connected to drive the lamp which illuminates at least two photocells, one cell is connected in the feedback path of the operational amplifier and the other or others are used as voltage controlled resistors. The circuit operates to control the lamp so that the feedback cell resistance is inversely proportional to the input voltage to the amplifier. Since the remaining cell or cells receive the light from the programmed lamp, they too vary in resistance inversely proportional to the input voltage. If the remaining cell or cells are connected in an oscillator circuit where the frequency is inversely proportional to the resistance, such as in an R–C bridge oscillator, the oscillator frequency will vary directly in accordance with the input voltage.

The present invention concerns electronic oscillators and, in particular, ultrastable voltage programmable oscillators.

Voltage programmable electronic oscillators are useful as analog to digital converters as in telemetry applications where an analog quantity is to be transmitted over a wire or radio link to a receiving point. Two methods have been employed in the past to achieve voltage programming. One method employs an inductance in a tank circuit wherein the inductance is variable in accordance with DC voltage applied to a control winding. The other method employs voltage sensitive semiconductor capacitors which are also employed as tank circuit components. Both of these devices and methods are limited in the degree of stability, linearity and repeatability which can be achieved.

The present invention concerns a method of and means for programming an electronic oscillator of superior characteristics as to stability, linearity and repeatability. The present device employs operational amplifiers in combination with photoconductive cells utilized in resistance programmable oscillator circuits. Reference is made to co-pending applications Ser. No. 548,683, filed May 9, 1966, entitled, "Analog Multiplying/Dividing Systems," Ser. No. 549,984, filed May 13, 1966, entitled, "Electronic Analog Device for Raising to a Power or Deriving a Root," and Ser. No. 552,816, filed May 25, 1966, entitled, "Electronic Analog Device for Multiplying and Dividing, Raising to a Power or Deriving a Root With Amplifier Drift Compensation." It has been shown in these prior applications that the resistance of a photoconductive cell can be accurately programmed in accordance with the inverse function of a voltage by means of an operational amplifier. Briefly, a lamp driven by the output of an operational amplifier illuminates a photoconductive cell which in turn is connected in series with a feedback resistor between the output and the inverting input of the amplifier. With suitable adjustment of a resistor in series with this cell, the cell can be made to be accurately proportional to the inverse of the input voltage to the operational amplifier. One or more additional photo conductive cells optically coupled to the same lamp so as to receive the same amount of light as the first cell will exhibit resistances substantially equal to the resistance of the first cell, i.e., resistances inversely proportional to the input voltage to the operational amplifier.

I have found that this phenomenon is ideally suited to voltage program an R–C bridge electronic oscillator. The R–C oscillator has a frequency which varies inversely as the values of R. I have found that the above described programmed resistance makes a uniquely useful resistor for the R–C bridge oscillator since the resistance of the photo conductive cells are inversely proportional to a voltage and the oscillator frequency is precisely proportional to the inverse of the resistors R. Thus, when the photo conductive resistors are utilized in the R–C bridge oscillator circuit, the oscillator frequency is accurately proportional to the input voltage to the operational amplifier.

I have also found that other resistance programmable oscillators can be similarly frequency controlled. One such other oscillator is the relaxation oscillator in which case I have found such a circuit utilizing a unijunction transistor is particularly useful. Since the unijunction transistor oscillator basically requires only one programmable resistor, my photoconductive cell system when applied to this circuit requires only two photoconductive cells for its essential operation.

Accordingly one object of the present invention is to provide methods of and means for accurately programming an electronic oscillator proportionally to a voltage.

Another object is to utilize photoconductive cells in conjunction with an operational amplifier and an R–C oscillator circuit to provide a simple, stable and accurately voltage programmable oscillator.

Still another object is to provide an electronic oscillator which is accurately programmable in accordance with a control voltage over a wide frequency range.

A further object is to provide a voltage programmable oscillator which is very stable over a long period of time and in the presence of environmental conditions such as operating voltage and ambient temperature.

A still further object is to provide a voltage programmable oscillator which exhibits a very low hysteresis effect.

Another object is to provide an oscillator of ultra high accuracy and linearity as a function of programming voltage.

A still further object is to program the frequency of a relaxation oscillator such as a relaxation oscillator utilizing a unijunction transistor by means of a photoconductive cell.

These and other objects will be apparent from the detailed description of the invention given in connection with the various figures of the drawing.

Figure 1:
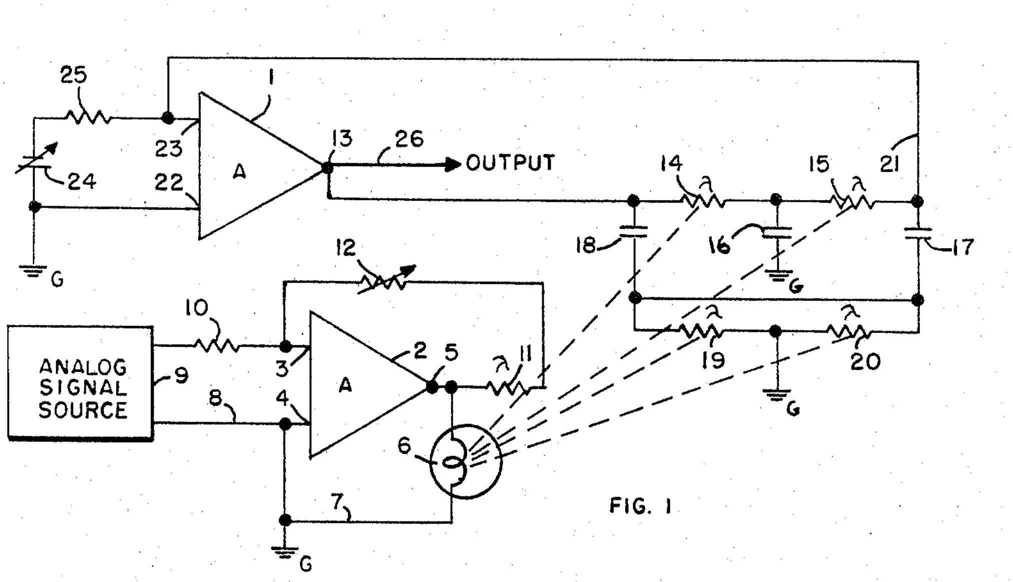
FIGURE 1 is a part schematic, part block diagram of one form of the present invention utilizing a form of R-C oscillator circuit.

FIGURE 1 shows two operational amplifiers 1 and 2 or their equivalents (see the definition of "operational amplifiers" as used herein which is given below). Amplifier 2 has an inverting input at terminal 3, a common terminal 4 and an output terminal 5. The output terminal 5 is connected to a source of illumination comprising lamp 6 which is returned over lead 7 to common terminal 4 which may be grounded at G. Connected from output terminal 5 is a photoconductive cell 11 in series with an adjustable resistor 12 which in turn is connected to inverting input terminal 3. Cell 11 is positioned to receive light from lamp 6 so that its resistance is a function of the brilliance of lamp 6. The input 3 is also programmed by a voltage such as the voltage from analog signal source 9 connected through input resistor 10 and returned to common terminal 4 over lead 8. The circuit as described so far will program the resistance of cell 11 in accordance with the inverse of the voltage from source 9.

The circuit of FIGURE 1 also includes a second operational amplifier 1 having an output terminal 13, an inverting input terminal 23 and a common terminal 22 connected to ground G. Between output 13 and input 23 is connected an R-C network of a form suitable for use in an oscillator circuit. Particularly, in the present circuit a bridge-T circuit is shown comprising capacitors 16, 17 and 18 and resistors 14, 15, 19 and 20. In effect this circuit consists of resistors 14 and 15 connected in series with their common point returned to ground G through capacitor 16 and capacitors 17 and 18 connected in series with their common connection returned to ground G through resistors 19 and 20 in parallel. The output 13 of amplifier 1 is connected to the junction between resistor 14 and capacitor 18 while the junction between resistor 15 and capacitor 17 is connected back to inverting input terminal 23. The R-C oscillator circuit as described is generally constructed with capacitor 17 equal to capacitor 18, capacitor 16 equal to twice capacitor 18, resistor 14 equal to resistor 15 and the resistor to ground equal to one-half resistor 15. The relative values of the resistors will be as stated if all resistors 14, 15, 19 and 20 are equal since resistors 19 and 20 are effectively in parallel. This circuit oscillates at a frequency substantially equal to $1/RC6.28$. As is indicated these resistors, in accordance with the present invention are photoconductive cells receiving light from lamp 6.

The above set forth resistor values will be provided by these photoconductive cells 14, 15, 19 and 20 if they are similar to cell 11 and are positioned to receive substantially the same amount of light from lamp 6 as does cell 11. Thus, the frequency of oscillation of the oscillator circuit will depend on the resistances of the photoconductive cells which in turn are proportional to the inverse of the voltage from source 9 applied through resistor 10 to input 23. Therefore, since the resistance of the cells is an inverse function of the source voltage and the frequency is an inverse function of the resistances the oscillator frequency will be a linear function of the source voltage, i.e., the oscillator frequency will be proportional to the value of the source voltage. It has been found where the function of oscillator frequency vs. source voltage starts to depart from linearity at the high frequency end of the scale, that the linear range can be extended by varying resistor 12.

Figure 2:
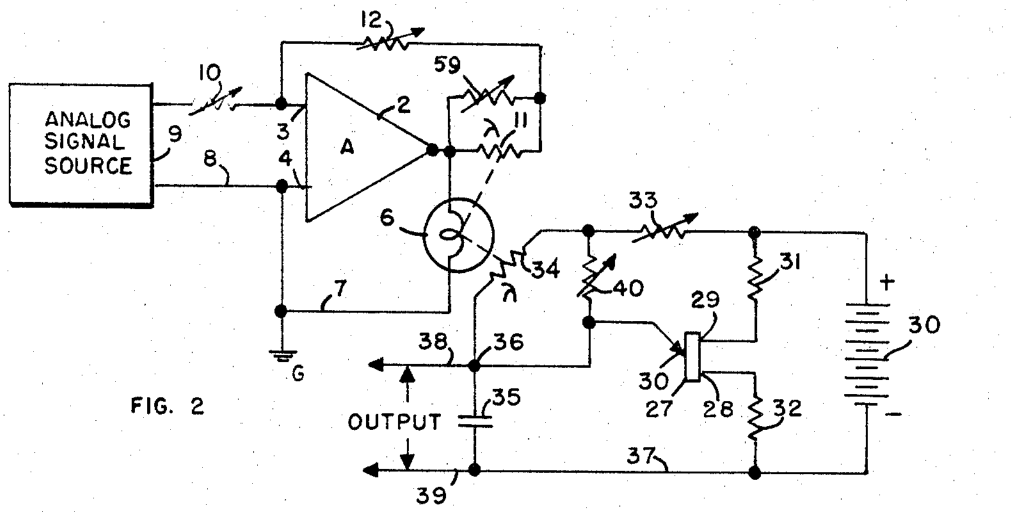
FIGURE 2 is a part schematic, part block diagram of another form of the present invention utilizing a unijunction transistor in a relaxation oscillator circuit.

FIGURE 2 shows a voltage programmed oscillator which has been found to be very stable and which utilizes considerably fewer parts than are required for the oscillator circuit of FIGURE 1. The operational amplifier 2, lamp 6 and photoconductive cell 11 are connected as was described above in describing the circuit of FIGURE 1. The oscillator of FIGURE 2 consists of a unijunction transistor 27 connected as an R-C relaxation oscillator. Unijunction transistor 29 includes an anode 29 connected through resistor 31 to the positive side of a bias voltage source 30, a cathode 28 connected through resistor 32 to the negative side of the bias source 30, and gate 30 connected to the junction 36 between resistors 33 and 34 and capacitor 35 connected across the bias source 30. This circuit oscillates as a relaxation oscillator at a rate which depends directly on the values of resistors 33 and 34 and capacitor 35. The oscillator output is taken off across capacitor 35 over leads 38 and 39.

I have found that the frequency of this unijunction transistor relaxation oscillator is inversely proportional to the resistance of resistor 34. Thus, if resistor 34 is a photoconductive cell positioned to receive light from lamp 6, the frequency will be programmed by the voltage from source 9. If cell 34 is positioned to receive light from lamp 6 which is substantially equal to the light received by cell 11, cell 34 will be programmed substantially inversely proportional to the voltage from source 9. Since the frequency of oscillation of the unijunction transistor oscillator is inversely proportional to the resistance of cell 34, the oscillation frequency will be a substantially linear direct function of the voltage from source 9.

I have found that various additional means may be employed to extend the range of linearity or to modify the relationship between the frequency of oscillation and the voltage of source 9. These means include adjustable resistor 12 in series with cell 11 which is useful in modifying or extending the frequency range to higher frequencies and adjustable resistor 59 in shunt with cell 11 is useful in modifying or limiting the lower end of the frequency range. Resistors 33 and 40 may be utilized in much the same way, adjustable resistor 33 in series with cell 34 modifying the high frequency end of the oscillator range and adjustable resistor 40 in shunt with cell 34 modifying or limiting the low frequency end of the range. Adjustable resistor 10 has a major effect in the mid-frequency range. Once the desired result has been attained, fixed values of resistors 10, 12, 33, 40 and 59 may be utilized or one or more may be omitted for a particular result.

Figure 3:
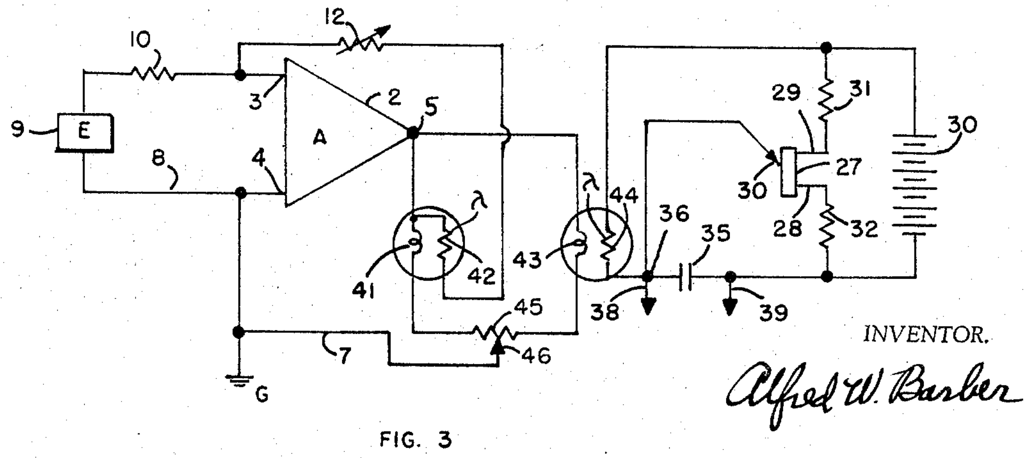
FIGURE 3 is a part schematic, part block diagram of still another form of the present invention utilizing a unijunction transistor in a relaxation oscillator circuit.

FIGURE 3 shows a circuit utilizing two lamps each associated with a separate photoconductive cell. This circuit is useful in certain applications although it lacks some of the major advantages of the common lamp, multiple cell system. In FIGURE 3 the operational amplifier 2 is output connected to drive lamp 41 and photoconductive cell 42 receiving a portion of the light from lamp 41 is connected as the major feedback impedance between output 5 and inverting input 3. Series resistor 12 may be included in the feedback circuit. This circuit controls the voltage across lamp 41 so that the resistance of cell 42 is inversely proportional to the voltage from source 9. If a second lamp 43 with associated cell 44 is connected in shunt with lamp 41 it will be programmed identically and cell 44 can be connected as the resistor of a relaxation oscillator employing unijunction transistor 27. However, identical lamp and cell characteristics are not likely so that to even approximate the controlled results of the circuit of FIGURE 2, a balancing potentiometer 45 is provided with adjustable contact 46 returned to ground G over lead 7. In this case potentiometer 45 must be readjusted to compensate differential aging effects of the lamps and cells.

Figure 4:
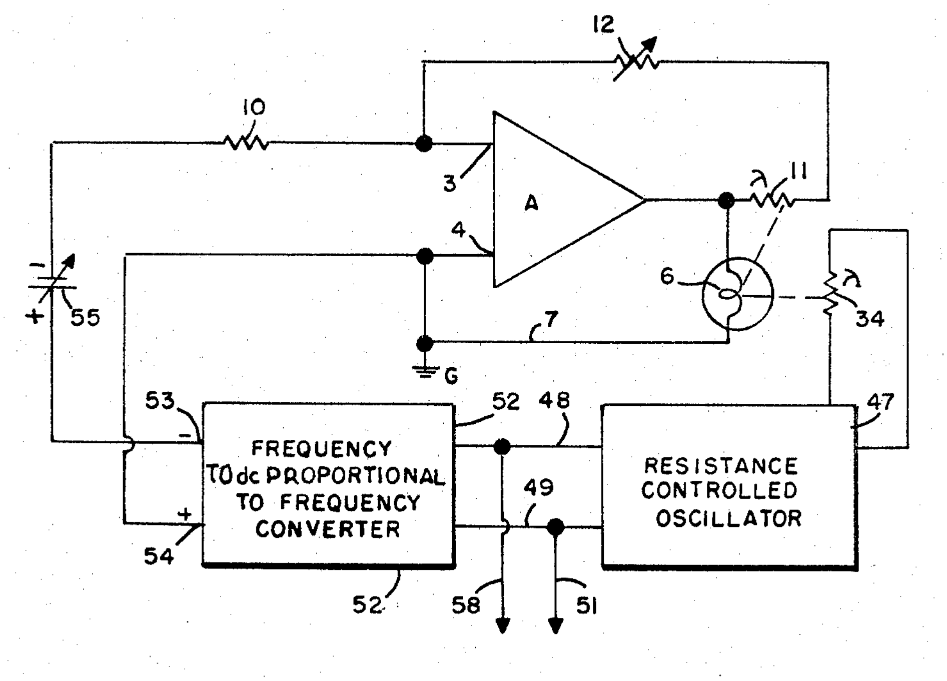
FIGURE 4 is a part schematic, part block diagram of still another form of the present invention utilizing a second feedback circuit.

FIGURE 4 shows how the voltage controlled oscillator of the present invention can be stabilized to somewhat greater degree. This by means of dual feedback control, one feedback through the lamp/cell combination of FIGURES 1, 2 and 3 and the second a voltage feedback from a frequency discriminator type of circuit. The operational amplifier 2 is connected with lamp 6, cell 11 and input resistor 10 as in the above figures. The second cell 34 is connected to a resistance controlled oscillator 47 in a frequency determining manner. The oscillator over leads 48 and 49 is applied to a frequency to DC proportional to frequency converter 52 which may be a frequency discriminator, integrating or similar device which produces a DC voltage proportional to frequency. The DC voltage from converter 52 across output terminals 53 and 54 and is connected to oppose the programming input source voltage 55. This is a degenerative connection and provides frequency stabilization in addition to that provided by the basic lamp/cell circuit of FIGURES 2 and 3. The frequency stabilized oscillator voltage is conducted to utilization means, not shown, over leads 51 and 58.

Figure 5:
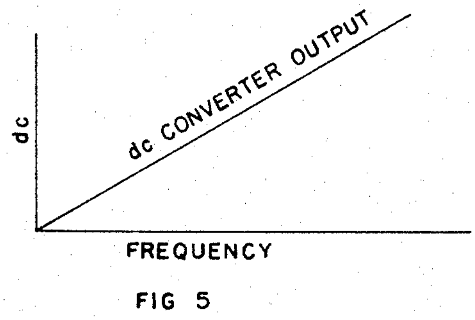
FIGURE 5 is a graphical representation illustrating one mode of operation of the present invention.

FIGURE 5 shows a graph of the output of a typical converter suitable for use as converter 52 in FIGURE 4 showing how the DC output voltage is essentially linear and proportional to the frequency of the resistance controlled oscillator.

The term "operational amplifier" is intended to describe a DC amplifier having substantial gain and low phase shift over a proscribed range, an output terminal, an input terminal and a common terminal wherein the input terminal is inverting with respect to the output and will accept a substantial amount of degenerative feedback from the output as well as an input signal. The various circuits are represented with the operational amplifier output terminals connected directly to the lamps or sources of illumination although it is to be understood that a non-inverting power amplifier may be interposed without departing from the spirit of the invention. Similarly a non-inverting amplifier together with an inverting power amplifier may be employed.

While only a few forms of the present invention have been shown and described, many modifications will be apparent to those skilled in the art and within the spirit and scope of the invention as set forth in particular in the appended claims.

What is claimed is:

1. In a voltage controlled oscillator device, the combination of, an operational amplifier including an output, an inverting input and a common connection, a current responsive source of light coupled to said output, a photoconductive cell positioned to intercept a portion of the light from said source of light, circuit connections providing a feedback from said output to said input through said cell for controlling the gain of said amplifier in accordance with the intensity of said source of light, a source of voltage coupled between said input and said common terminal, an oscillator frequency controllable by means of resistance, a second photoconductive cell positioned to intercept a portion of the light from said source of light and means for coupling said second cell to said oscillator as a frequency controlling resistance.

2. A voltage controlled oscillator as set forth in claim 1 wherein said oscillator is a bridge-T R-C oscillator.

3. A voltage controlled oscillator as set forth in claim 1 wherein said oscillator comprises an R-C oscillator circuit and a second operational amplifier.

4. A voltage controlled oscillator as set forth in claim 1 wherein said input connected source of voltage is adjustable to control the frequency of said oscillator in proportion to said voltage.

5. A voltage controlled oscillator as set forth in claim 1 wherein said oscillator is a relaxation oscillator.

6. A voltage controlled oscillator as set forth in claim 1 wherein said oscillator utilizes a unijunction transistor.

7. A voltage controlled oscillator as set forth in claim 1 and including a frequency to DC converter coupled to said oscillator and providing a DC output substantially proportional to the frequency of said oscillator and means for feeding said DC in a regenerative mode to said input of said operational amplifier.

8. A voltage controlled oscillator as set forth in claim 1 and including at least one resistor coupled to one of said cells for modifying the relationship between the frequency of said oscillator and said input connected voltage.

9. A voltage controlled oscillator as set forth in claim 1 and including a first resistor in series with the first said cell and a resistor in shunt with the same said cell for modifying the relationship between the frequency of said oscillator and said input connected voltage.

References Cited

UNITED STATES PATENTS 3,060,388 10/1962 Ball et al. ---------- 31—111 X

OTHER REFERENCES

Electronic Design, "Digital Oscillator Provides Settable Frequencies, Voltages," 2 pages, July 20, 1964, 331–141.

Electronics World, pp. 38–39, September 1965.

ROY LAKE, *Primary Examiner.*

S. H. GRIMM, *Assistant Examiner.*